(12) United States Patent
Shih

(10) Patent No.: US 11,371,547 B2
(45) Date of Patent: Jun. 28, 2022

(54) WOOD SCREW STRUCTURE

(71) Applicant: BI-MIRTH CORP., Kaohsiung (TW)

(72) Inventor: Yi-Chieh Shih, Kaohsiung (TW)

(73) Assignee: BI-MIRTH CORP., Kaohsiung (TW)

( * ) Notice: Subject to any disclaimer, the term of this patent is extended or adjusted under 35 U.S.C. 154(b) by 314 days.

(21) Appl. No.: 16/681,611

(22) Filed: Nov. 12, 2019

(65) Prior Publication Data

US 2021/0140462 A1 May 13, 2021

(51) Int. Cl.
*F16B 25/10* (2006.01)

(52) U.S. Cl.
CPC ............ *F16B 25/103* (2013.01); *F16B 25/10* (2013.01)

(58) Field of Classification Search
CPC .. F16B 25/00; F16B 25/0015; F16B 25/0031; F16B 25/0052; F16B 25/0057; F16B 25/0068; F16B 25/103; F16B 33/008; F16B 35/065; F16B 25/10
USPC .......................... 411/383, 411, 412, 424, 426
See application file for complete search history.

(56) References Cited

U.S. PATENT DOCUMENTS

| | | | | |
|---|---|---|---|---|
| 5,827,030 A * | 10/1998 | Dicke | ................. | F16B 25/0015 411/387.4 |
| 6,616,391 B1 * | 9/2003 | Druschel | ............. | F16B 25/0015 411/187 |
| 7,682,119 B2 * | 3/2010 | Chen | .................... | F16B 25/0057 411/411 |
| 2006/0285940 A1 * | 12/2006 | Walther | .............. | F16B 25/0073 411/421 |
| 2009/0162165 A1 * | 6/2009 | Chen | .................... | F16B 25/0015 411/412 |
| 2012/0294693 A1 * | 11/2012 | Gonciarz | ............ | F16B 25/0052 411/387.1 |
| 2013/0039720 A1 * | 2/2013 | Shih | ..................... | F16B 25/0015 411/387.4 |
| 2015/0050101 A1 * | 2/2015 | Shih | ..................... | F16B 25/0052 411/411 |
| 2015/0052735 A1 * | 2/2015 | Kochheiser | ......... | F16B 25/0084 29/525.11 |
| 2015/0147137 A1 * | 5/2015 | Ban | ...................... | F16B 25/0015 411/387.8 |
| 2015/0184685 A1 * | 7/2015 | Su | .......................... | F16B 25/103 411/387.2 |
| 2017/0045075 A1 * | 2/2017 | Hsu | ...................... | F16B 25/0052 |
| 2017/0284447 A1 * | 10/2017 | Falkenstein | ......... | F16B 25/0047 |

* cited by examiner

*Primary Examiner* — Roberta S Delisle
(74) *Attorney, Agent, or Firm* — Muncy, Geissler, Olds & Lowe, P.C.

(57) ABSTRACT

A wood screw structure comprises a screw head section, a rod section, a first screw thread and a plurality of crushing rib units. The rod section is sequentially integrally formed from the screw head section and comprises a first rod portion connecting the screw head section, a second rod portion, a third rod portion, and a tapered portion extending and tapering outwardly from the third rod portion. The first screw thread is disposed spirally and is protruded on an outer peripheral surface of the tapered portion, the second rod portion and the third rod portion. The crushing rib units are disposed spirally and protruded around the outer peripheral surface of the third rod portion and the tapered portion, and each of the crushing rib units includes a plurality of crushers protrudingly disposed on a rib body. A first discharge gap is formed between the crushers.

9 Claims, 6 Drawing Sheets

WOOD SCREW STRUCTURE

FIELD OF THE INVENTION

The present invention relates to a screw for locking wood, and more particularly to a wood screw structure which is easy to discharge chippings and capable of reducing a torque of locking rotationally to prevent the locked wooden material from cracking.

BACKGROUND OF THE INVENTION

When wood screw is locked into wood, wood with higher hardness has a greater resistance to external force due to high density, which makes screwing the wood screw more laborious, and wood chippings generated during the screwing process are not effectively discharged. The wood chippings remain in the wood and the wood chippings are pressed by the pressure of screwing the wood screw, which easily causes cracking of the wood.

However, if the conventional wood screw is formed with a plurality of irregularly protruded patterns between the screw threads, the pattern will cause unevenness of biting force between the pattern portion of the wood screw and an object during the tapping and locking process, and may cause problems of unstable joint and shaking after the wood screw is tapped. The pattern can be composed of a plurality of rib structures, and the rib structures are not provided with chip discharging structure, so that the wood chippings generated during the tapping and locking process are easily accumulated between the pattern portions and the object, and thus the problem that the object crack may occur since the pressure between the wood screw and the object is increased. In addition, in the wood screw manufacturing process, since the screw threads of each section are spaced apart, the manufacturing process is complete by separately performing multiple times, resulting in problems of higher costs and time-consuming. In view of the above problems, the inventor of the present invention provides a wood screw structure for discharging chippings easily to overcome the conventional drawbacks.

SUMMARY OF THE INVENTION

An object of the present invention is to solve the above problems in the prior art that tapping and locking wood with the conventional wood screw cannot provide effective chippings discharge and disperse the pressure between an object and the screw.

In order to achieve the above object, the present invention provides a wood screw structure comprising a screw head section, a rod section, a first screw thread and a plurality of crushing rib units, wherein the screw head section includes a top portion and a neck portion extending from the top portion and tapering toward a direction opposite to the top portion. The rod section is integrally formed from the neck portion of the screw head section, the rod section includes a first rod portion connecting the neck portion, a second rod portion, a third rod portion, and a tapered portion extending and tapering outwardly from the third rod portion. The second rod portion is disposed between the first rod portion and the third rod portion, and the third rod portion is disposed between the second rod portion and the tapered portion. The first screw thread is disposed spirally and is protruded on an outer peripheral surface of the tapered portion, the second rod portion and the third rod portion. A plurality of crushing rib units are disposed spirally and protruded around the outer peripheral surface of the third rod portion and the tapered portion, each of the plurality of crushing rib units is crisscrossed with the first screw thread to form an included angle, and each of the plurality of crushing rib units including a rib body and a plurality of crushers protrudingly disposed on the rib body. Moreover, a first discharge gap is formed between the plurality of crushers; and an outer diameter of the plurality of crushers is smaller than a screw diameter of the first screw thread, and greater than a rod diameter of the third rod portion.

Further, the first screw thread disposed on the third rod portion comprises a plurality of second discharge gaps.

Further, each rib body forms a first side and a second side at joints with the outer peripheral surface of the third rod portion and the tapered portion, and the first screw thread forms a third side and a fourth side at joints with the outer peripheral surface of the second rod portion, the third rod portion and the tapered portion. Moreover, the first side crisscrosses with the third side at the outer peripheral surface of the third rod portion to form a first included angle, and an angle of the first included angle is in a range from 40 and 70 degrees.

Further, the first side crisscrosses with the fourth side at the outer peripheral surface of the third rod portion to form a second included angle, and an angle of the second included angle is in a range from 110 and 130 degrees.

Further, the first side crisscrosses with the third side at the outer peripheral surface of the tapered portion to form a third included angle, and an angle of the third included angle is in a range from 50 and 70 degrees.

Further, the first side crisscrosses with the fourth side at the outer peripheral surface of the tapered portion to form a fourth included angle, and an angle of the fourth included angle is in a range from 110 and 130 degrees.

Further, a degree of the first included angle is different from a degree of the third included angle.

Further, the second side crisscrosses with the third side at the outer peripheral surface of the third rod portion to form a fifth included angle, an angle range of the fifth included angle is in a range from 110 and 130 degrees, and an angle of a sum of the first included angle and the fifth included angle is in a range from 150 and 200 degrees.

Further, a second screw thread is formed at an end of the first rod portion abutting the second rod portion and corresponding to the top portion.

Further, a difference between an outer diameter of the plurality of crushers and a screw diameter of the first screw thread is 0.6 mm to 0.7 mm.

Therefore, the present invention has the following beneficial efficacies over the prior art:

The present invention is provided with the plurality of crushing rib units on the outer peripheral surface of the third rod portion of the rod section, and the first discharge gap are formed between the crushers of the plurality of crushing rib units, with the first discharge gaps wood chippings produced during tapping and locking of the wood screw can be discharged between two adjacent portions of the first screw thread, and the plurality of crushers can be used to further crush the wood chippings, so that the wood chippings are smoothly discharged during subsequent chippings discharge, and the pressure between the wood screw and the object is evenly released to achieve smooth chippings discharge during tapping and locking.

BRIEF DESCRIPTION OF THE DRAWINGS

FIG. 1B is a partial perspective enlarged view of 1B labeled in

FIG. 1A;

DETAILED DESCRIPTION OF THE PREFERRED EMBODIMENTS

The technical features and operation modes of the present application described in the following preferred embodiments in conjunction with the accompanying figures are provided as reference for examining. In addition, the figures in the present invention are not necessarily drawn according to actual scales in order to facilitate illustrating the proportions. The proportions in the figures are not intended to limit the scope of the requested claims.

Please refer to FIG. 1A, FIG. 1B, FIG. 2A, FIG. 2B, and FIG. 2C for a first embodiment of the present invention. The present invention provides a wood screw structure, which comprises a screw head section 10, a rod section 20, a first screw thread 30 and a plurality of crushing rib units 40. The wood screw structure of the present invention is used for fixing or joining wooden workpieces, such as wooden floors, wooden furniture, etc., but is not limited thereto.

Figure 1A:
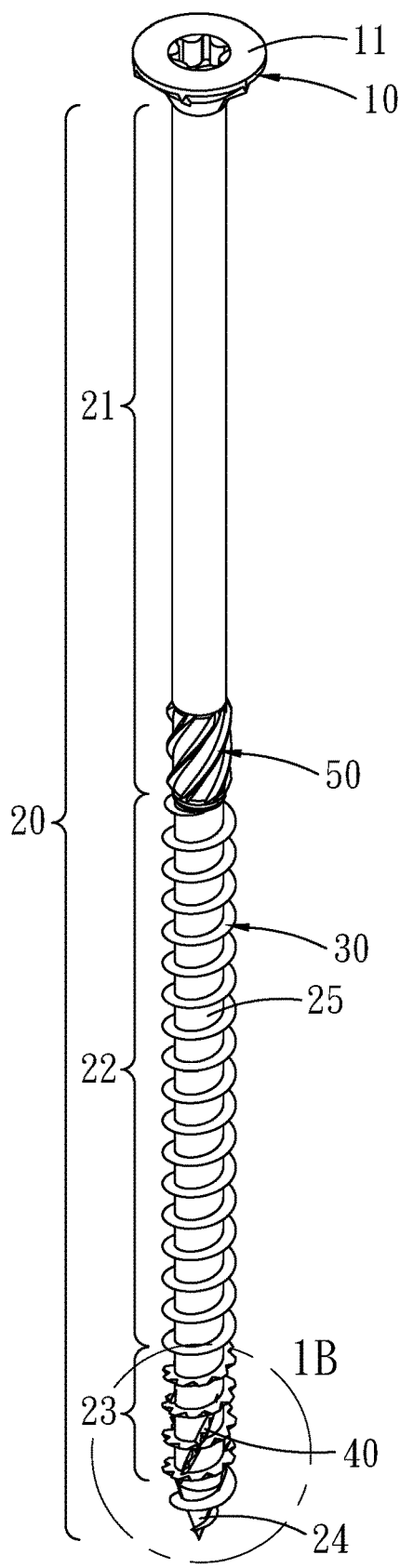
FIG. 1A is a perspective view of a wood screw structure of a first embodiment of the present invention.
Figure 1B:
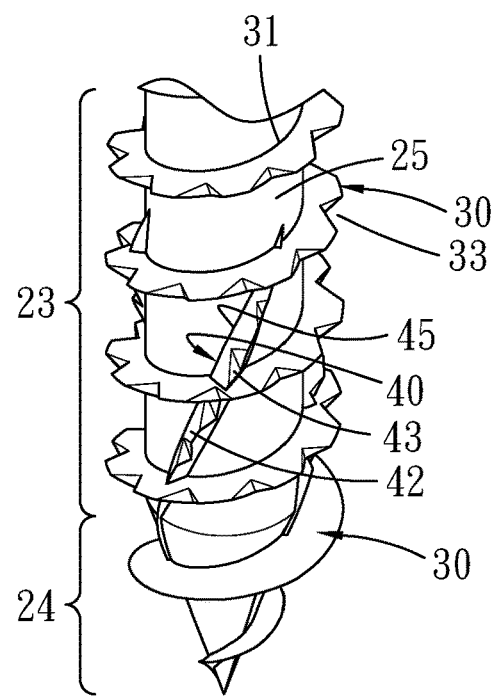
Figure 2A:
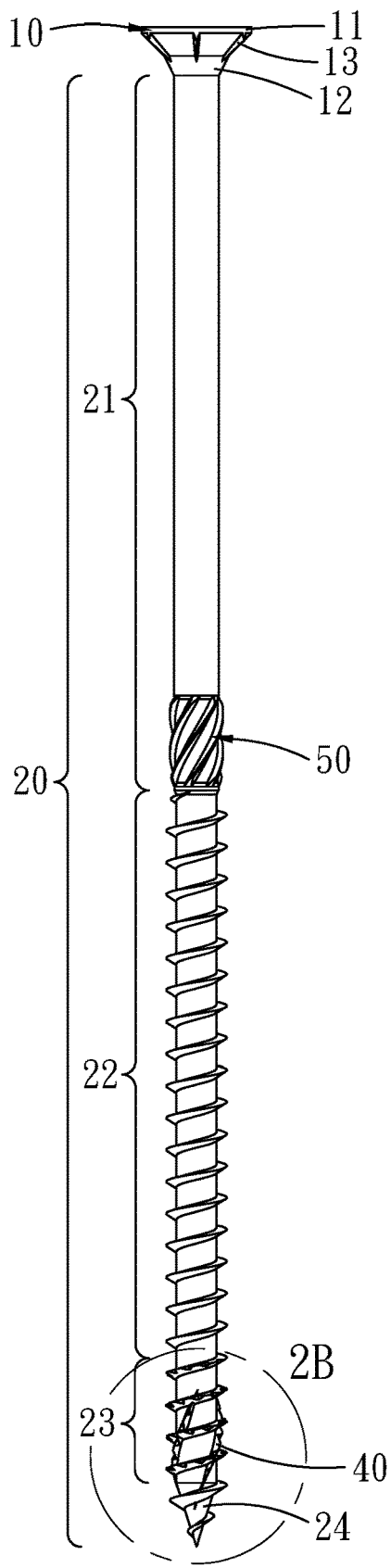
FIG. 2A is a front view of the wood screw structure of the first embodiment of the present invention.

More specifically, please refer to FIG. 2A, the screw head section 10 includes a top portion 11, and a neck portion 12 extending from the top portion 11 and tapering toward a direction opposite to the top portion 11. The neck portion 12 is provided with a plurality of ribs 13, and the plurality of ribs 13 are capable of enhancing the embedding property with an object after a wood screw with the wood screw structure is locked into the object.

Figure 2B:
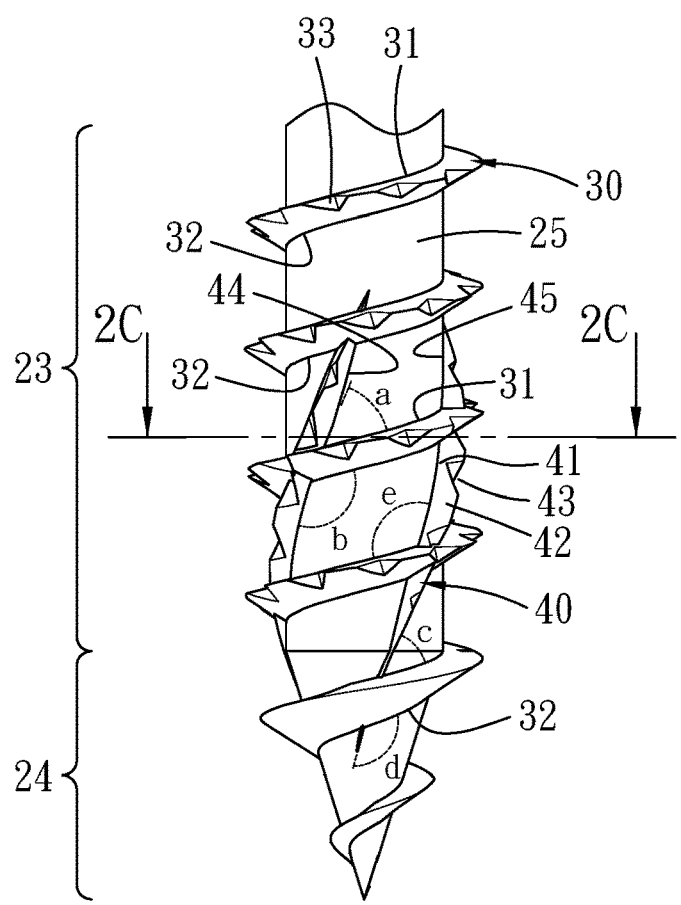
FIG. 2B is a partial enlarged view of 2B labeled in FIG. 2A.
Figure 2C:
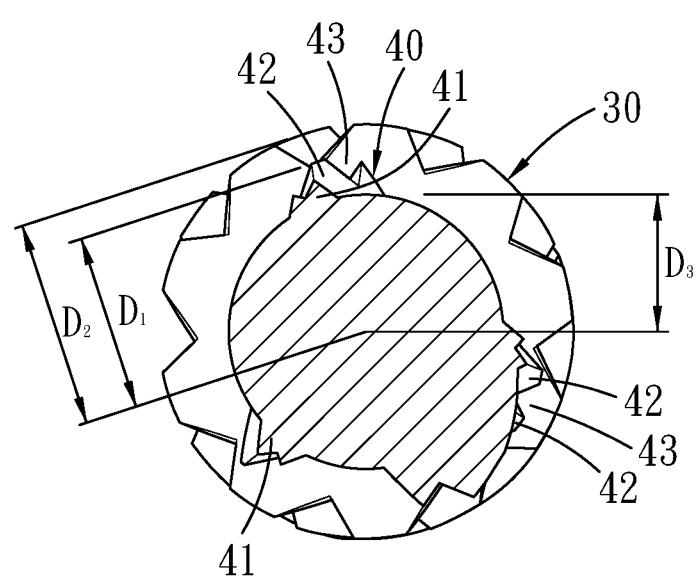
FIG. 2C is a cross-sectional view of the 2C-2C section line of FIG. 2B.
Figure 3A:
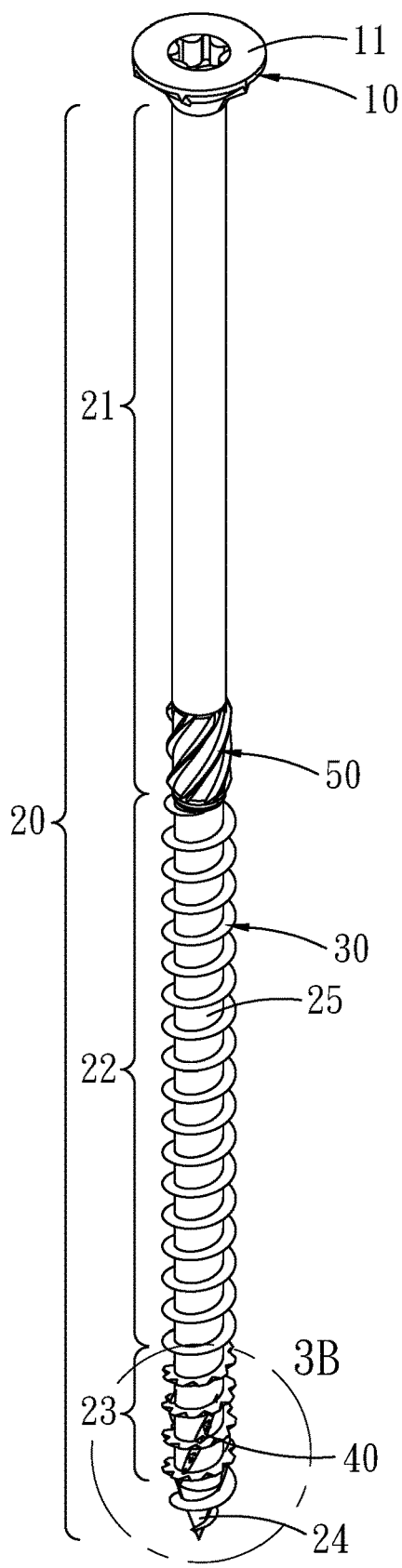
FIG. 3A is a perspective view of the wood screw structure of a second embodiment of the present invention.
Figure 3B:
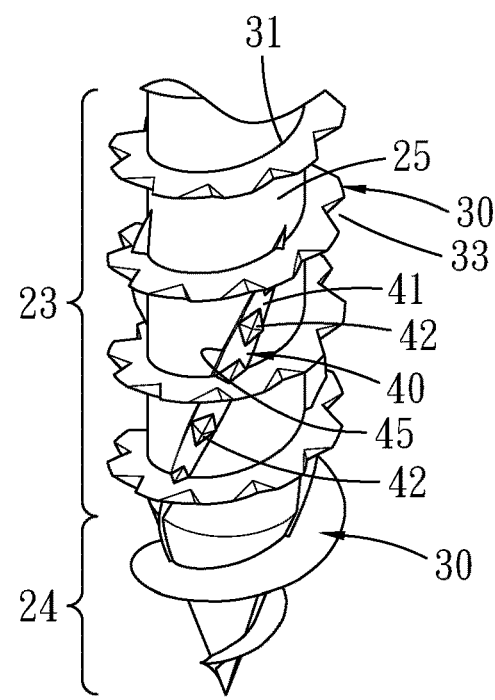
FIG. 3B is a partial perspective enlarged view of 3B labeled in FIG. 3A.
Figure 4A:
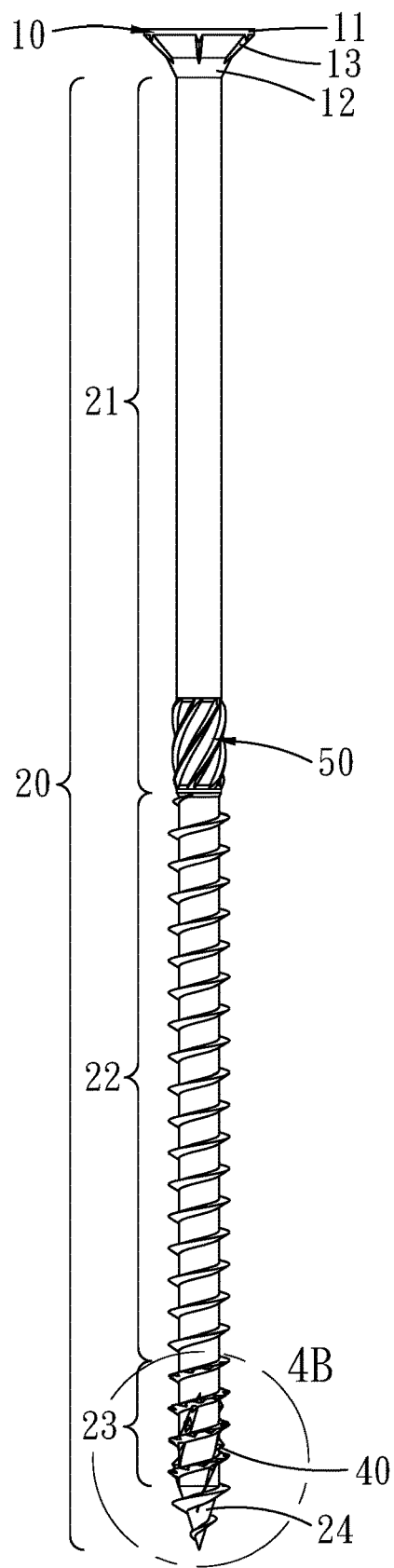
FIG. 4A is a front view of the wood screw structure of the second embodiment of the present invention.
Figure 4B:
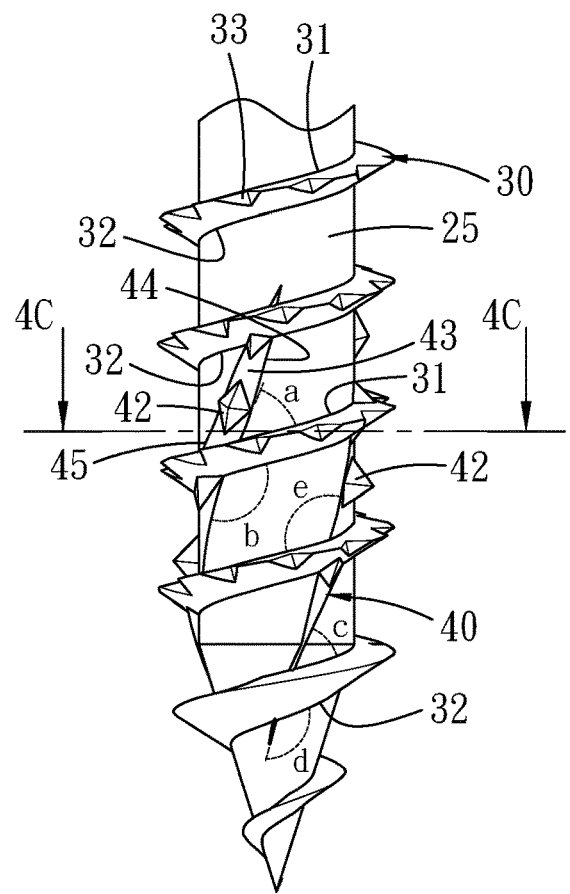
FIG. 4B is a partial enlarged view of 4B labeled in FIG. 4A.
Figure 4C:
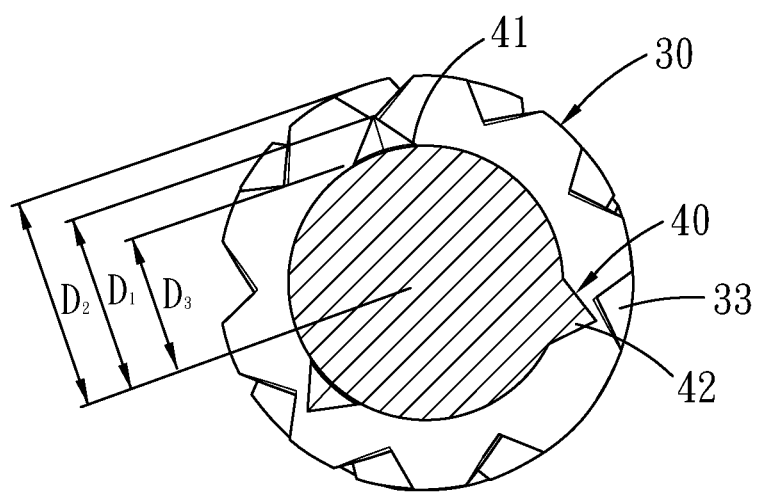
FIG. 4C is a cross-sectional view of the 4C-4C section line of FIG. 4B.

Please refer to FIG. 2A and FIG. 2B, the rod section 20 is integrally formed from the neck portion 12 of the screw head section 10, and the rod section 20 includes a first rod portion 21 connecting the neck portion 12, a second rod portion 22, a third rod portion 23, and a tapered portion 24 extending and tapering outwardly from the third rod portion 23. The second rod portion 22 is disposed between the first rod portion 21 and the third rod portion 23, and the third rod portion 23 is disposed between the second rod portion 22 and the tapered portion 24; and the first rod portion 21, the second rod portion 22, the third rod portion 23 and the tapered portion 24 of the embodiment are integrally formed in sequence.

The first screw thread 30 is disposed spirally and is protruded on an outer peripheral surface 25 of the tapered portion 24, the second rod portion 22 and the third rod portion 23.

The plurality of crushing rib units 40 are disposed spirally and protruded around the outer peripheral surface 25 of the third rod portion 23 and the tapered portion 24, and each of the plurality of crushing rib units 40 is crisscrossed with the first screw thread 30 to form an included angle. Furthermore, in the embodiment, the plurality of crushing rib units 40 with a quantity of three are formed on the third rod portion 23 and the tapered portion 24, but are not limited thereto. Please refer to FIG. 2B and FIG. 2C, each of the plurality of crushing rib units 40 includes a rib body 41 and a plurality of crushers 42 protrudingly disposed on the rib body 41, wherein a shape of the plurality of crushers 42 is in a shape of a cutting edge or a pyramid, the pyramid may be a triangular pyramid or a quadrangular pyramid, but is not limited thereto. In the embodiment, the shape of the plurality of crushers 42 is a quadrangular pyramid, and a first discharge gap 43 is formed between the plurality of crushers 42. When wood chippings are discharged from the outer peripheral surface 25 between two adjacent portions of the first screw thread 30 through the first discharge gap 43, the chippings passing through the plurality of crushing rib units 40 are further cut by the plurality of crushers 42 with the use of the first discharge gap 43 to facilitate cutting of wood fibers. Therefore, the wood chippings being cut off are continuously discharged along a space of the outer peripheral surface 25 between the two adjacent portions of the first screw thread 30.

Moreover, an outer diameter D1 of the plurality of crushers 42 is smaller than a screw diameter D2 of the first screw thread 30, and larger than a rod diameter D3 of the third rod portion 23, and a difference between the outer diameter D1 of the plurality of crushers 42 and the screw diameter D2 of the first screw thread 30 is in a range from 0.6 mm to 0.7 mm, so that the wood chippings discharge is prevented from being blocked by the plurality of crushing rib units 40 during locking.

In addition, each rib body 41 forms a first side 44 and a second side 45 at joints with the outer peripheral surface 25 of the third rod portion 23 and the tapered portion 24, and the first screw thread 30 forms a third side 31 and a fourth side 32 at joints with the outer peripheral surface 25 of the second rod portion 22, the third rod portion 23 and the tapered portion 24. Further, the first side 44 crisscrosses with the third side 31 at the outer peripheral surface 25 of the third rod portion 23 to form a first included angle a, and an angle of the first included angle a is in a range from 40 to 70 degrees. The first side 44 crisscrosses with the fourth side 32 at the outer peripheral surface 25 of the third rod portion 23 to form a second included angle b, and an angle of the second included angle b is in a range from 110 to 130 degrees. The first side 44 crisscrosses with the third side 31 at the outer peripheral surface 25 of the tapered portion 24 to form a third included angle c, and an angle of the third included angle c is in a range from 50 and 70 degrees. The first side 44 crisscrosses with the fourth side 32 at the outer peripheral surface 25 of the tapered portion 24 to form a fourth included angle d, and an angle of the fourth included angle d is in a range from 110 and 130 degrees. In addition, a degree of the first included angle a is different from a degree of the third included angle c, and the second side 45 crisscrosses with the third side 31 at the outer peripheral surface 25 of the third rod portion 23 to form a fifth included angle e, and an angle of the fifth included angle e is in a range from 110 and 130 degrees. The sum of angle values of the first included angle a and the fifth included angle e is in a range from 150 and 200 degrees, and the first angles a between two adjacent portions of the first screw thread 30 are different. Thus, with the different first angles a between the two adjacent portions of the first screw thread 30, different angles for cutting apart the wood fibers are provided to increase the efficiency of cutting the wood chippings.

Moreover, the first screw thread 30 disposed on the third rod portion 23 is recessed to form a plurality of second discharge gaps 33, thereby reaming a hole is performed by the first screw thread 30, with the second discharge gaps 33 disposed on the third rod portion 23. That is, since the screw diameter D2 of the first screw thread 30 with the second discharge gaps 33 disposed on the third rod portion 23 is larger than the rod diameter D3, after the tapered portion 24 is locked and positioned into a workpiece, the first screw thread 30 with the second discharge gaps 33 disposing on the third rod portion 23 is capable of reducing the contact with the object during the subsequent tapping and locking process. Besides, the reamed holes of the plurality of second discharge gaps 33 for discharging chippings are capable of reducing friction, so that it is labor-saving for a user to tap and lock the wood screw into the object. A second screw thread 50 is formed at one end of the first rod portion 21 abutting the second rod portion 22 corresponding to the top portion 11, wherein the second screw thread 50 of the present embodiment is roughly presented as a twill appearance.

Please refer to FIG. 3A, FIG. 3B, FIG. 4A, FIG. 4B, and FIG. 4C, which are a second embodiment of the present invention, and its main structure is substantially the same as the first embodiment of the present invention, so the same parts are not described herein again, only different structural parts are described as follows. The plurality of crushers 42 of the crushing rib units 40 of the second embodiment are rhombic quadrangular pyramids, thereby when the wood chippings generated during tapping of a screw hole pass through the first discharge gap 43, the wood chippings are crushed and cut apart by the plurality of crushers 42, and discharged quickly through the first discharge gap 43 between the two of the plurality of crushers 42 to prevent the chippings from remaining between the wooden object and the wood screw to be squeezed and pressed with each other, causing frictional force to be increased and even cracking of the wooden object. Further, outer circumferences of the first screw thread 30 and the second screw thread 50 are provided with cutting edges, so that frictional force produced during rotation is effectively reduced, and locking efficiency is improved.

In summary, the outer diameter D1 of the crushers 42 of the crushing rib units 40 of the wood screw structure of the present invention is smaller than the screw diameter D2 of the first screw thread 30 and the difference is in a range from 0.6 mm and 0.7 mm, thereby the wood chippings discharge is prevented from being blocked by the plurality of crushing rib units 40 during locking, and the chippings are further crushed quickly and discharged quickly when the object is screwed and tapped, so that the wood chippings are discharged outside of the object, and pressure between the object and the wood screw is evenly released. Furthermore, the first screw thread, the second screw thread and the cutting edges on their outer circumferences can be positioned in the object to provide stability during tapping and locking and to improve the accuracy of alignment.

What is claimed is:

1. A wood screw structure, mainly comprising:
a screw head section, including a top portion and a neck portion extending from the top portion and tapering toward a direction opposite to the top portion;
a rod section, integrally formed from the neck portion of the screw head section, the rod section including a first rod portion connecting the neck portion, a second rod portion, a third rod portion, and a tapered portion extending and tapering outwardly from the third rod portion, wherein the second rod portion is disposed between the first rod portion and the third rod portion, and the third rod portion is disposed between the second rod portion and the tapered portion;
a first screw thread disposed spirally and is protruded on an outer peripheral surface of the tapered portion, the second rod portion and the third rod portion; and
at least one crushing rib unit disposed spirally and protruded around the outer peripheral surface of the third rod portion and the tapered portion, each crushing rib unit being crisscrossed with the first screw thread to form an included angle, wherein each crushing rib unit includes a rib body and a plurality of crushers protrudingly disposed on the rib body;
wherein a first discharge gap are formed between the plurality of crushers;
wherein an outer diameter of the plurality of crushers is smaller than a screw diameter of the first screw thread, and greater than a rod diameter of the third rod portion;
wherein each rib body forms a first side and a second side at joints with the outer peripheral surface of the third rod portion and the tapered portion, and the first screw thread forms a third side and a fourth side at joints with the outer peripheral surface of the second rod portion, the third rod portion and the tapered portion; and
wherein the first side crisscrosses with the third side at the outer peripheral surface of the third rod portion to form a first included angle, the first side crisscrosses with the third side at the outer peripheral surface of the tapered portion to form a third included angle, and a degree of the first included angle is different from a degree of the third included angle.

2. The wood screw structure as claimed in claim 1, wherein the first screw thread disposed on the third rod portion comprises a plurality of second discharge gaps.

3. The wood screw structure as claimed in claim 1, wherein an angle of the first included angle is in a range from 40 and 70 degrees.

4. The wood screw structure as claimed in claim 3, wherein the first side crisscrosses with the fourth side at the outer peripheral surface of the third rod portion to form a second included angle, and an angle of the second included angle is in a range from 110 and 130 degrees.

5. The wood screw structure as claimed in claim 3, wherein the first side crisscrosses with the fourth side at the outer peripheral surface of the tapered portion to form a fourth included angle, and an angle of the fourth included angle is in a range from 110 and 130 degrees.

6. The wood screw structure as claimed in claim 3, wherein the second side crisscrosses with the third side at the outer peripheral surface of the third rod portion to form a fifth included angle, an angle of the fifth included angle is in a range from 110 and 130 degrees, and a sum of angle values of the first included angle and the fifth included angle is in a range from 150 and 200 degrees.

7. The wood screw structure as claimed in claim 1, wherein an angle of the third included angle is in a range from 50 and 70 degrees.

8. The wood screw structure as claimed in claim 1, further comprising a second screw thread being formed at an end of the first rod portion abutting the second rod portion and corresponding to the top portion.

9. The wood screw structure as claimed in claim 1, wherein a difference between an outer diameter of the plurality of crushers and a screw diameter of the first screw thread is 0.6 mm~0.7 mm.

\* \* \* \* \*